Aug. 23, 1938.    J. BARTHOLOWSKY    2,127,580
EXTENSIBLE CAMPING TRAILER
Filed Feb. 8, 1937    2 Sheets-Sheet 1
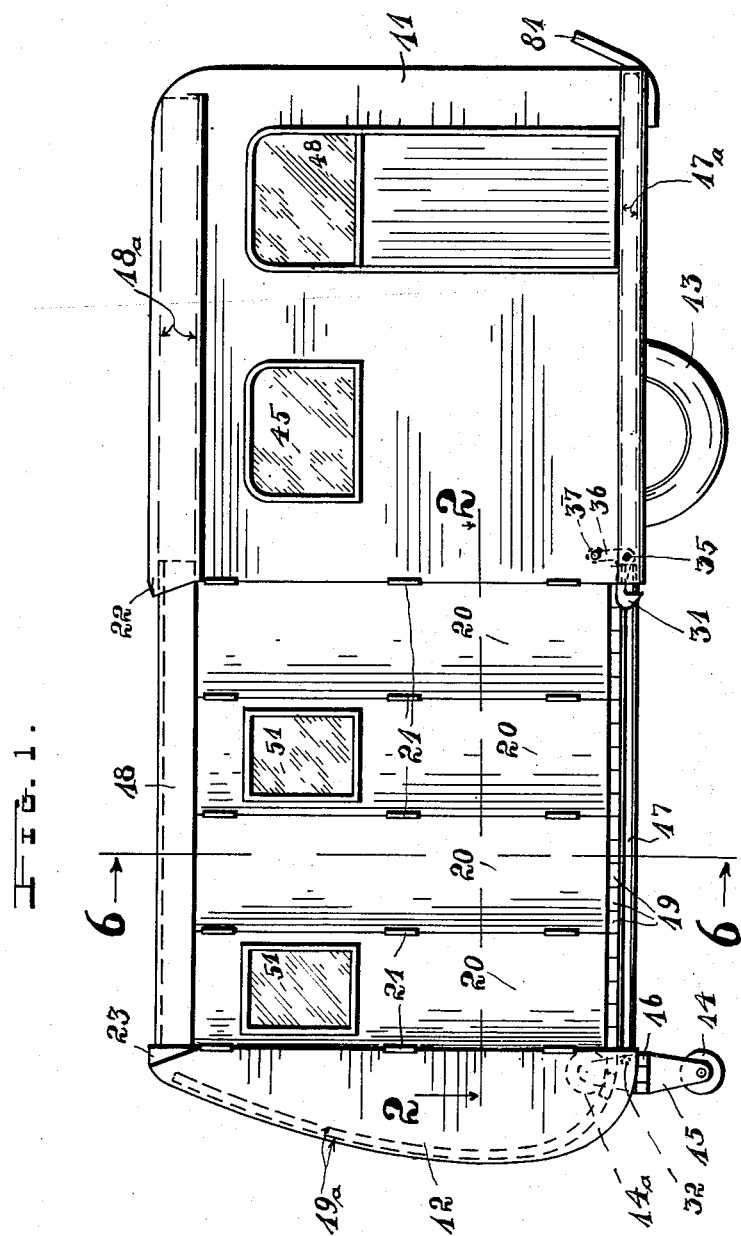
INVENTOR:
JOHANNES BARTHOLOWSKY,
By: Otto H. Ringer,
his Atty.

Aug. 23, 1938.  J. BARTHOLOWSKY  2,127,580
EXTENSIBLE CAMPING TRAILER
Filed Feb. 8, 1937  2 Sheets-Sheet 2
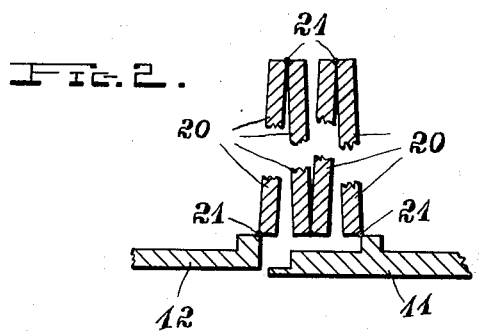
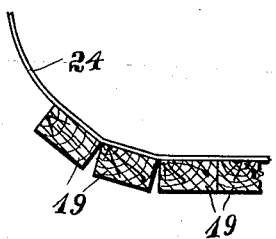
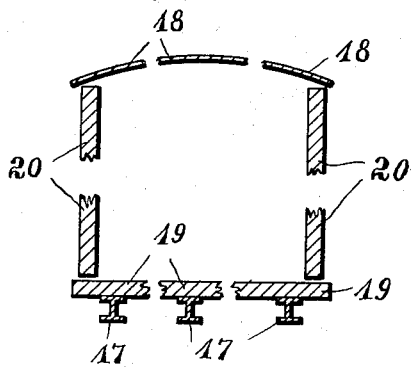
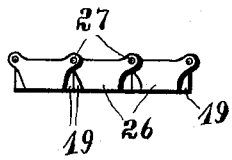
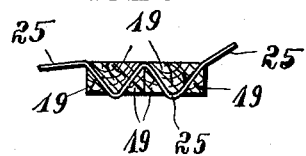
INVENTOR:
JOHANNES BARTHOLOWSKY, Patented Aug. 23, 1938

2,127,580

UNITED STATES PATENT OFFICE 2,127,580

EXTENSIBLE CAMPING TRAILER

Johannes Bartholowsky, Los Angeles, Calif.

Application February 8, 1937, Serial No. 124,656

1 Claim. (Cl. 296—26)

This invention relates to vehicles of the type commonly attached to the rear of other vehicles that are driven by some sort of automotive force.

One of the objects of the invention is to provide a comparatively short trailer while operated along curved roads, which, however, can be extended to a longer form when camped.

Another object is to provide a trailer with means whereby the trailer embodies all the necessary parts to extend it to a comfortable length with ample space for camping purposes.

Another object is to provide parts to form rigid connections when the trailer is extended, while such parts readily adapt themselves to the shorter trailer.

Another object is to provide means for securing the extensible trailer into a rigid shorter traveling form.

Other objects will appear from the following description and appended claim as well as from the accompanying drawings, in which—

Fig. 1 is a side elevation of a trailer embodying this invention, being in extended condition.

Fig. 2 is a fragmentary horizontal section through the folding panels on line 2—2 of Fig. 1.

Fig. 3 is a side elevation of a portion of a simple form of flexible floor.

Fig. 4 is a fragmentary side elevation of a slightly modified form of flexible floor.

Fig. 5 is another slightly modified form of flexible floor.

Fig. 6 is a fragmentary cross section on line 6—6 of Fig. 1, merely showing the principal parts of the structure.

As illustrated, the trailer is made of a sectioned main body, of which the larger front part or section 11 is supplemented by a smaller rear, cap-like section 12, these two sections practically making up the whole length of this trailer when traveling on a road.

Any number of wheels may be provided, depending largely on the weight and general size of the trailer, which, in turn, may depend on the requirements of different people, preferably, however, only a pair of wheels is desired at about the location indicated at 13.

When this trailer is camped, nevertheless, emergency or supplemental wheels are provided, to support the extended rear end, such wheels being indicated at 14, preferably provided on a bracket 15, swingably mounted as at 16, to be moved upwardly, out of the way, to the position indicated at 14a, so as to not drag on the road when the trailer is traveling.

The rear section 12 has firmly embodied in its structure a suitable number of suitably strong rails 17, extending from this rear section 12 into corresponding guideways 17a in the framework of the larger front section 11, being the bottom interconnection between these two sections of the main body of this trailer.

In the roof, a similar arrangement is provided in that the roof portion 18 forms a rigid part of the rear section 12 and extending also into a corresponding guideway 18a in the section 11, just under the roof of the larger section 11, thereby forming the top interconnection between the two sections of the main body of the trailer.

A flexible floor 19 rests on the rails 17 this floor being firmly connected to the floor in the larger section 11 and, when the two sections are in short traveling relation, this floor is made to move into guideway 19a, provided for this purpose in the rear wall of the section 12.

Folding panels 20 are hingedly connected between the two sections 11 and 12 as clearly shown in the drawings, serving to strengthen the interconnection between the sections of the main body of the trailer and to facilitate squarely shifting movements during the extending and collapsing of the trailer.

It will readily be understood that, when once extended fully, the squarely connected panels will hold the two sections 11 and 12 in firm relations to one another, and, when the extended trailer then stands on all the wheels 13 and 14, people may comfortably walk from one end of the trailer to the other end within the larger section 11 and between the spread panels 20.

Of course, such panels 20 are provided on the opposite sides of the trailer and connected by the hinges 21 on both sides forming additional rooms between the panels.

While some of the customary furnitures and fixtures may be installed permanently in the section 11, other furniture and fixtures may be of the movable type, packed in the section 11 during the traveling, to be transferred to the space and rooms between the panels when the trailer is extended during camping periods, and it will easily be understood that various arrangements can be provided, to make this extensible trailer suitable for larger parties.

Trailers have come to be used for convenience and comfort rather than for mere emergency, and to make any trailer really convenient and comfortable, trailers have come to be built of rather long dimensions.

Commonly-built long trailers, however, have one disadvantage, in that traveling over very curving roads is difficult, particularly in mountainous districts.

With a trailer of the type disclosed here, on the other hand, conveniences and comforts of a long trailer can readily be had while camping; while, during the traveling, the difficulties of the long trailer are not present.

The panels 20 are simply folded together until the rear section 12 abuts against the front section 11, and in this abutting, short, form, the two sections 11 and 12 are firmly connected by any latching device, in the drawing a hook 31 being, for instance, indicated in the rear end of the section 11, to engage the pin 32, indicated in the front side of the rear section 12.

The hook 31, as illustrated, is shown pivotally mounted at 35, with an upwardly extending lever portion 36, provided with an eye 37, by which the hook can be securely bolted in position, to safeguard against any accidental unhooking.

The rear edge 22 of the roof of the section 11 is made to overlap the rear section 12 at the edge 23, serving to prevent leaks, and such a cap, of course may be made of any form to suit requirements of different builders and to suit various forms of trailers.

Having indicated a door 48 and window 45 in the section 11, and other windows 51 in the panels, it should be understood that such mere details are entirely within the choice of builders and users of such trailers.

However, the whole arrangement is such that it allows any desired and advantageous provision of windows and even doors in the strong panels, since the folding, such as indicated in Fig. 2 will not damage any transparent material that may be used for the windows.

From Fig. 2 it should also be clear that the securing of the folding panels is not necessarily limited to the particular showing, the showing being merely for the sake of making the arrangement of extending trailer understood.

A floor is, perhaps, most simply made flexible by an application of a flexible or pliable covering, such as cloth, or canvas, or linoleum, to the top surface of the crosswise arranged floor-slags 19, in the manner as indicated at 24 in Fig. 3.

A few wires, cables, or string of some sort, may easily be inserted through the adjoining boards of the floor in the manner indicated at 25 in Fig. 5, to also provide the desired flexibility.

Then again, metal plates 26 with eyes 27 may be applied to the ends of the floor-boards 19 in the manner illustrated in Fig. 4.

These several modifications readily make it clear that the invention is not limited to one form and that a floor can easily be made flexible to work and operate satisfactory for the purpose involved here.

Fig. 6 shows a fragmentary illustration of the longitudinally disposed shiftable rails 17, supporting the transversely disposed floor boards 19, with the oppositely disposed upright panels 20, and the roof 18.

Having thus described my invention, I claim:—

In a trailer, a body consisting of front, rear, and intermediate sections, the front section constituting a structure of a rigidly built-up form suitable for living purposes and having a pocket in its roof and having furthermore a flexible floor in alignment with and continuing from the regular floor of the front section, the rear section constituting the back wall of a form to align with the outer contours of the front section in closed up condition of the rear and intermediate sections against the rear end of the normally dimensioned and rigid front section and having a roof portion telescopically mounted in the pocket of the front section and having furthermore a pocket in the back wall to receive the flexible floor of the front section, the intermediate section being constituted by the roof-portion of the rear section and the flexible floor of the front section besides vertically hinged panels connected to the vertical sides of the first-named sections.

JOHANNES BARTHOLOWSKY.